US006585881B2

(12) United States Patent
Davis et al.

(10) Patent No.: US 6,585,881 B2
(45) Date of Patent: Jul. 1, 2003

(54) PROCESS FOR MANUFACTURE AND IMPROVED MANGANESE DIOXIDE FOR ELECTROCHEMICAL CELLS

(75) Inventors: Stuart M. Davis, Norfolk, MA (US); Peter R. Moses, Windham, NH (US); Gary Miller, Milton, MA (US)

(73) Assignee: The Gillette Company, Boston, MA (US)

(*) Notice: Subject to any disclaimer, the term of this patent is extended or adjusted under 35 U.S.C. 154(b) by 171 days.

(21) Appl. No.: 09/788,754

(22) Filed: Feb. 20, 2001

(65) Prior Publication Data

US 2002/0157963 A1 Oct. 31, 2002

(51) Int. Cl.$^7$ .................................................. C25B 1/00
(52) U.S. Cl. .................... 205/539; 205/57; 205/338; 205/412; 205/542; 205/638; 433/59
(58) Field of Search ................ 205/412, 539, 205/637, 638, 542, 338, 57; 423/599

(56) References Cited

U.S. PATENT DOCUMENTS

| 4,069,116 A | * | 1/1978 | Dzhaparidze et al. | ....... 205/542 |
| 4,083,757 A | * | 4/1978 | Dzhaparidze et al. | ....... 205/542 |
| 4,295,943 A | * | 10/1981 | Tomov et al. | ............. 205/541 |
| 5,746,902 A |   | 5/1998 | Takehara et al. | .............. 205/57 |
| 6,143,446 A |   | 11/2000 | Davis et al. | ................. 429/224 |

FOREIGN PATENT DOCUMENTS

DE 3337568 4/1985

OTHER PUBLICATIONS

Mauthoor, M; Bryson, A.W.; and Crundwell, F.K., "Properties of Electrolytic Manganese Dioxide Produced at Elevated Temperatures and Pressures", Progress in Batteries & Battery Materials, vol. 16 (1997), pp. 105–109.*

Nartey, V.K.; Binder, L.; and Huber, A., "Production and characterisation of titanium doped electrolytic manganese dioxide for use in rechargeable alkaline zinc/manganese dioxide batteries", Journal of Power Sources, vol. 87 (2000), pp. 205–211.*

Binder, L.; Jantscher, W.; Hofer, F.; and Kothleitner, G., "Production and characterisation of electrolytically doped manganese dioxide", Journal of Power Sources, vol. 70 (1998), pp. 1–7.*

Williams, R.; Freidlein, R.; Lawrance, G.; Swinkels, D.; and Ward, C., "Effect of Deposition Conditions on the Structural, Chemical, Physical, and Electrochemical Properties of EMD", Progress in Battery & Battery Materials, vol. 13 (1994), pp. 102–112.*

* cited by examiner

Primary Examiner—Patrick Ryan
Assistant Examiner—Thomas H. Parsons
(74) Attorney, Agent, or Firm—Barry D. Josephs; Paul I. Douglas; Thomas G. Krivulka

(57) ABSTRACT

A process for manufacture of manganese dioxide comprising subjecting an aqueous bath comprising manganese sulfate ($MnSO_4$) and sulfuric acid ($H_2SO_4$) to electrolysis in a closed cell wherein the electrolysis bath is maintained at an elevated temperature above 110° C., preferably above 115° C. and at superatmospheric pressure. Desirably the bath can be maintained at an elevated temperature between about 115° C. and 155° C. The electrolysis is carried out preferably at elevated current density of between about 12.5 and 37 Amp/sq. ft (135 and 400 Amp/sq. meter) which allows for smaller or fewer electrolysis units. An $MnO_2$ product having a specific surface area (SSA) within desired range of between 18–45 $m^2/g$ can be obtained. A doping agent, preferably a soluble titanium dopant is employed to help obtain the desired specific surface area (SSA) of the $MnO_2$ product. The manganese dioxide product in zinc/$MnO_2$ alkaline cells gives excellent service life, particularly in high power application.

33 Claims, 5 Drawing Sheets

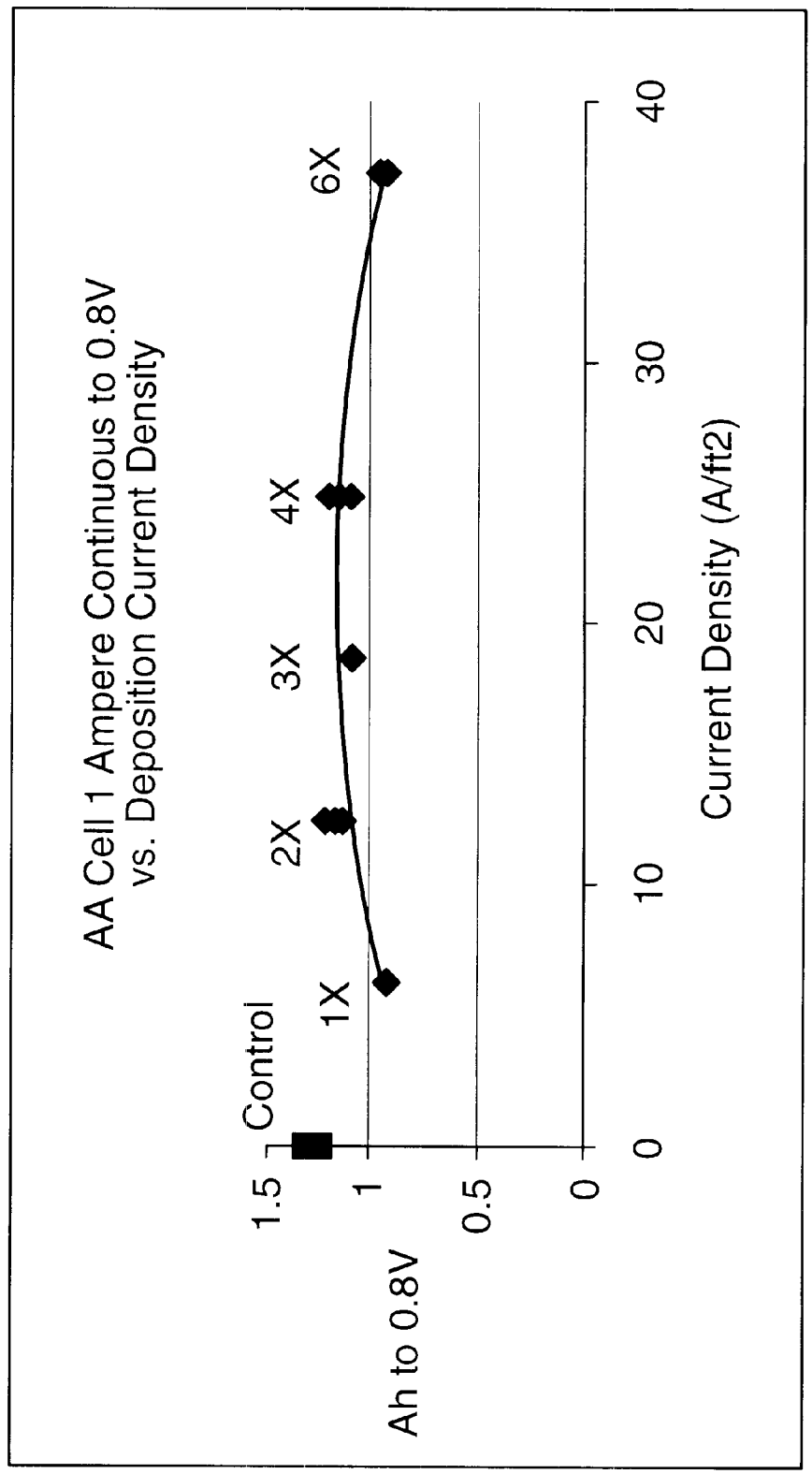

PROCESS FOR MANUFACTURE AND IMPROVED MANGANESE DIOXIDE FOR ELECTROCHEMICAL CELLS

FIELD OF THE INVENTION

The invention relates to manganese dioxide useful as cathode active material in electrochemical cells, particularly alkaline cells. The invention also relates to an electrolysis process for preparing manganese dioxide having lower manufacturing cost.

BACKGROUND

Conventional alkaline electrochemical cells are formed of a cylindrical casing. The casing is initially formed with an enlarged open end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing forms the positive terminal.

The cell contents of a primary alkaline cell typically contain zinc anode active material, alkaline electrolyte, a manganese dioxide cathode active material, and an electrolyte permeable separator film, typically of cellulose. The anode active material comprises zinc particles admixed with conventional gelling agents, such as carboxymethylcellulose or acrylic acid copolymers, electrolyte and, optionally, some zinc oxide. The gelling agent holds the zinc particles in place and in contact with each other. A conductive metal nail, known as the anode current collector, is typically inserted into the anode active material. The alkaline electrolyte is typically an aqueous solution of potassium hydroxide, but other alkali solutions of sodium or lithium hydroxide may also be employed. The cathode material is typically of manganese dioxide and normally includes small amounts of carbon or graphite to increase conductivity. Conventional alkaline cells have solid cathodes comprising battery grade particulate manganese dioxide. Battery grade manganese dioxide as used herein refers to manganese dioxide generally having a purity of at least about 91 percent by weight (dry basis). Electrolytic $MnO_2$ (EMD) is the preferred form of manganese dioxide for alkaline cells because of its high density and since it is conveniently obtained at high purity by electrolytic methods.

EMD (electrolytic manganese dioxide) can be manufactured from the direct electrolysis of an aqueous bath of manganese sulfate and sulfuric acid. The EMD is a high purity, high density, gamma manganese dioxide, desirable as a cathode material for electrochemical cells particularly $Zn/MnO_2$ alkaline cells, Zn-carbon and lithium/$MnO_2$ cells. During the electrolysis process the gamma EMD is deposited directly on the anode which is typically made of titanium, lead, lead alloy, or graphite. The EMD is removed from the anode, crushed, ground, washed in water, neutralized by washing with dilute NaOH, Na2CO3, NH4OH or LiOH, and dried in a rotary dryer. The EMD product is generally heat treated to remove residual water before it is used in a lithium cell. Conventional electrolysis processes for the manufacture of EMD and a description of its properties appear in Batteries, edited by Karl V. Kordesch, Marcel Dekker, Inc. New York, Vol. 1 (1974), p.433–488. Conventional electrolysis processes for production of $MnO_2$ are normally carried out at temperature between about 80 and 980° C.

M. Mauthoor, A. W. Bryson, and F. K. Crudwell, Progress in Batteries & Battery Materials, Vol. 16 (1997), pp. 105–110 discloses an electrolysis method for manufacture of manganese dioxide. The electrolysis is performed at temperatures between 90 and 108° C. Although Mauthoor reports that discharge capacities of $MnO_2$ synthesized by electrolysis of an aqueous bath of $MnSO_4$ and $H_2SO_4$ at between 95° C. to 108° C. was about 9% higher than that for $MnO_2$ material produced at 95°C., there was no substantial difference among the three $MnO_2$ products produced at electrolysis temperatures of 100° C., 105° C., and 108° C. In fact, as Mauthoor increased the electrolysis temperature from 105 to 108° C., the percent $MnO_2$ in the electrolysis product and the discharge capacity of the $MnO_2$ product both decreased slightly. Thus, electrolysis at temperatures higher than 108° C. were not attempted or contemplated.

In commercial EMD production, the electrolysis is normally carried out at temperatures between 94° C. and 97° C. and at current densities between 2 and 10 Amp/$ft^2$, more typically between 4 and 10 Amp/$ft^2$ of anode surface area. A titanium anode and graphite or copper cathode are typically employed. Increasing current density tends to increase the $MnO_2$ specific surface area (SSA). When electrolysis is carried out at conventional temperatures and current density is increased beyond the normal bounds, there is a tendency for the specific surface area (SSA) of the $MnO_2$ product to increase to a level which is outside (greater than) the desired range of between 18–45 $m^2$/g. Thus, at conventional temperatures it is very difficult to increase the current density and the deposition rate above a level of between about 10 to 11 Amp/$ft^2$ (108 to 119 Amp/$m^2$) without adversely affecting the quality of the product.

In addition, under conventional conditions of temperature and electrolyte composition, at current densities greater than 10 Amp/$ft^2$ (108 Amp/$m^2$) there is a tendency for passivation of the titanium anode to occur after a period of time, which may be shorter than the normal plating cycle of 1.5 to 3 weeks. The higher the current density, e.g. 12 Amp/$ft^2$ (130 Amp/$m^2$) rather than 10 Amp/$ft^2$ (108 Amp/$m^2$), the sooner such passivation is likely to occur. Passivation involves the formation of an insulating oxide film on the surface of the titanium, resulting in an increase in the operating Voltage of the anode. Once started the problem is self accelerating and soon results in a precipitous voltage rise which exceeds the capability of the power supply followed by a loss of current, ending in complete and irreversible shut-down of the plating process. Often a number of anodes will fail simultaneously due to passivation. When this occurs, the anodes must be withdrawn, deposited EMD removed and the anodes must be surface treated to remove the tenacious oxide film prior to being returned to service. This is a highly disruptive and expensive problem. In a commercial setting, great care is taken to avoid anode passivation and a margin of safety is preserved in setting the current density below that which borders on passivation, EMD quality considerations aside.

V. K. Nartey, L. Binder, and A. Huber, Journal of Power Sources, Vol. 87 (2000), p. 205–211 describes an electrolysis process for making $MnO_2$ wherein the electrolysis bath was doped with $TiOSO_4$. The $MnO_2$ was used in an alkaline rechargeable battery. The reference states at page 210, col. 1 that the $MnO_2$ with $TiOSO_4$ doping (called $M_2$, Table 7) performed poorly on the initial discharge cycle (i.e. similar to a primary, non-rechargeable cell) despite a high specific surface area. When the bath was doped with $TiO_2$ the $MnO_2$ product (called $M_1$, Table 7) performed better on the initial discharge cycle, but still did not perform as well as the control $MnO_2$ (commercial grade EMD Tosoh GH-S). The electrolysis bath for the experiments described in Huber, et al. was maintained at conventional temperature of 98° C.

and was performed at conventional current density of 6 milliAmp/cm² (5.57 Amp/ft²) based on anode surface area.

Conventional battery grade manganese dioxide does not have a true stoichiometric formula $MnO_2$, but is better represented by the formula $MnO_x$, wherein x is typically between about 1.92 to 1.96, corresponding to a manganese valence of between about 3.84 and 3.92. Conventional EMD may typically have a value for x of about 1.95 or 1.96, corresponding to a manganese valence of 3.90 and 3.92, respectively. In addition to manganese (Mn) and oxygen (O), conventional electrolytic manganese dioxide (EMD) also contains a certain quantity of $SO_4^=$ions and of $H^{30}$ ions (protons) in the crystal lattice. When heated to temperatures above 110 deg. C., the lattice protons combine with oxygen and are liberated as $H_2O$. Conventional EMD also has a real density of between about 4.4 and 4.6 g/cm³.

There are increasing commercial demands to make primary alkaline cells better suited for high power application. Modern electronic devices such as cellular phones, digital cameras, toys, flash units, remote control toys, camcorders and high intensity lamps are examples of such high power applications. Such devices demand high power, for example, an AA cell may be required to deliver high power between about 0.5 and 2 Watt which corresponds to current drain rates between about 0.5 and 2 Amp, more usually between about 0.5 and 1.5 Amp. Modern electronic devices such as cellular phones, digital cameras and toys, flash units, remote control toys, camcorders and high intensity lamps are examples of such high power applications. Thus, it is desirable to provide a way of reliably increasing the useful service life of conventional primary alkaline cells particularly for cells to be used in high power applications, without adversely affecting cell performance.

Accordingly it is desirable to extend the useful service life of electrochemical cells, particularly alkaline cells intended for high power applications.

SUMMARY OF THE INVENTION

An electrolysis unit is formed comprising an anode, a cathode, and an electrolysis bath comprising $H_2SO_4$ and $MnSO_4$ dissolved in water. An aspect of the invention is directed to subjecting said electrolysis bath to electrolysis at elevated temperature and super atmospheric pressure while in said electrolysis unit. It has been determined that electrolysis at elevated temperature over 110° C., preferably between 115° C. and 155° C., also advantageously between 120° C. and 155° C. and superatmospheric pressure is desirable in that it allows the electrolysis to be conducted at significantly higher current density (based on total anode surface) while maintaining the specific surface area of the product EMD in the desired range of 18 to 45 m²/g. The anode is typically of titanium. The cathode is typically of graphite. The electrolysis is carried out at elevated temperatures between about 110° C. and 180° C, preferably between about 115° C. and 155° C, also advantageously between 120° C. and 155° C. and corresponding superatmospheric vapor-liquid equilibrium pressure, or even at somewhat higher pressures. Specifically, conducting electrolysis at such elevated temperature, preferably between 115° C. and 155° C. and superatmospheric pressure allows higher current density of between 12.5 and 37 Amp/ft² (135 and 400 Amp/m²) more preferably between 18 and 37 Amp/ft² (194 and 400 Amp/M²), desirably between 18 and 30 Amp/ft² (194 and 324 Amp/M²) based on anode surface area, to be employed while avoiding passivation of the titanium anode which typically occurs at very high current densities, e.g. greater than about 10 to 11 Amp/ft² (108 and 119 Amp/m²). Essentially, electrolysis at temperature between 115° C. and 155° C. eliminates the problem of passivation of a titanium anode. (Passivation occurs as an insulating oxide film builds up on the anode.) It has been discovered that when the electrolysis is conducted at elevated temperature above 1150 C, e.g., between about 115° C. and 155° C. the problem of anode passivation of a titanium anode is essentially eliminated even if the current densities are increased to a level between 12.5 and 37 Amp/ft² (135 and 400 Amp/m²). By running the electrolysis at such higher current densities between 12.5 and 37 Amp/ft² (135 and 400 Amp/m²), preferably between 18 and 37 Amp/ft² (194 and 400 Amp/m²) of anode surface, a higher rate of production of $MnO_2$ is achieved. That is, there is a significantly increased rate of $MnO_2$ deposition on the anode (Kilograms $MnO_2$ per square meter of anode surface per hour) This in turn means that the same rate of $MnO_2$ production per hour can be obtained with smaller sized electrolysis units or else a fewer number of commercial sized electrolysis units can be employed. Therefore, capital investment in electrolysis equipment can be greatly reduced for the same $MnO_2$ production rate per hour. The $MnO_2$ produced under the electrolysis condition of elevated temperature between about 110° C. and 180° C., preferably between 115° C. and 155° C. coupled with increased current density between, 12.5 and 37 Amp/ft² (135 and 400 Amp/m2), preferably between 18 and 37 Amp/ft² (194 and 400 Amp/m²), desirably between 18 and 30 Amp/ft² (194 and 324 Amp/m²) results in an $MnO_2$ product (EMD) having satisfactory overall performance when used as cathode active material in alkaline cells.

One deleterious effect of conducting the electrolysis at the above stated elevated temperatures between 110° C. and 180° C., preferably between 115° C. and 155° C. and normal current densities (between 2 and 10 Amp/ft² (21.5 and 108 Amp/m²) typically between 4 and 10 Amp/ft² (43 and 108 Amp/m²) is that such operation has a tendency towards reducing the average specific surface area (SSA) of the MnO2 product. This can have a negative effect on overall performance of the $MnO_2$ when used as cathode active material in an alkaline cell. It has been determined that such deleterious effect can be compensated for by a) increasing the current density to a level of between about 12.5 and 37 Amp/ft² (135 and 400 Amp/m²) preferably between 18 and 37 Amp/ft² (194 and 400 Amp/m²) desirably between 18 and 30 Amp/ft² (194 and 324 Amp/m²) of anode surface or b) adding a soluble dopant, preferably a soluble titanium dopant to the electrolyte solution which is fed to the bath or to the bath itself. The most advantageous results are obtained when the electrolysis is conducted at both increased current density of between 12.5 and 37 Amp/ft² (135 and 400 Amp/m²), preferably between 18 and 37 Amp/ft² (194 and 400 Amp/m²) desirably between 18 and 30 Amp/ft² (194 and 324 Amp/m²) and a dopant, preferably a soluble titanium dopant, is also added to the electrolyte solution which is fed into the electrolysis bath or to the bath itself. In this latter case the resulting $MnO_2$ product exhibits excellent overall performance when used as cathode material in an alkaline cell. Also, as above mentioned because of operation at higher current density, the capital investment in electrolysis equipment can be significantly reduced (because of the higher $MnO_2$ deposition rate on the anode, smaller sized electrolysis units or fewer larger units can be employed). The doping agent or dopant is defined herein as an element, ion or compound that is soluble in the electrolysis bath or in the electrolyte solution which is fed into the electrolysis bath and has the effect of incrementally increasing the specific surface area (SSA) of the $MnO_2$ product. Preferred dopants are soluble titanium salts such as $TiOSO4$, $TiOCl2$, $CaTi_2O_4(OH)2$, $SrTiOF_4$ and $(TiO)_2P_2O_7$. A preferred titanium salt for use as a dopant herein is $TiOSO_4$.

It is desirable that the specific surface area (SSA) of the $MnO_2$ product be between 18 and 45 $m^2/g$. At specific surface area above 45 $m^2/g$ the individual crystallites become smaller and thus the number of individual crystallites within a fixed volume of $MnO_2$ becomes greater. This leads to smaller pores between the individual crystallites that comprise the $MnO_2$ particles. When the pores become too small, it becomes more difficult for the water molecules to enter therein and hydroxyl ions to leave when the $MnO_2$ is used as cathode active material in an alkaline cell. This results in a decrease in reaction rate and poor alkaline battery performance. On the other hand when the specific surface area of the $MnO_2$ product is much below 18 $m^2/g$, this results in insufficient surface for the electrochemical reaction to occur as the $MnO_2$ is discharged in an alkaline battery. Thus, it is desirable for the $MnO_2$ product to have a specific surface area (SSA) between 18 and 45 $m^2/g$.

It has been determined that since deposition of EMD at elevated temperature and super-atmospheric pressure tends to decrease specific surface area (SSA) and to favor the growth of larger, more perfect crystallites, a compensating adjustment or adjustments can be made to counter the effects of elevated temperature and return the product to a normal SSA (e.g. between 18–45 $m^2/g$). It has been determined that such compensating adjustments which have the effect of increasing the specific surface area of the manganese dioxide product are a) operation of the electrolysis at higher current density, desirably between about 12.5 and 37 $Amp/ft^2$ (135 and 400 $Amp/M^2$), preferably between 18 and 37 $Amp/ft^2$ (194 and 400 $Amp/M^2$) of anode surface and b) adding a doping agent such as water soluble titanium dopant, e.g. $TiOSO_4$ to the electrolyte solution which is fed to the electrolysis bath or to the electrolysis bath itself. It has been determined that the specific surface area of the manganese dioxide product can be desirably increased by conducting the electrolysis at said higher current density or adding the dopant. However, the most desirable overall effect is obtained when the electrolysis is conducted with both compensating adjustments being employed simultaneously. The use of the combination of these two adjustments readily elevates the specific surface area (SSA) of the $MnO_2$ product to the desired range of between 18 and 45 $m^2/g$. Additionally, the addition of dopant appears to cause some beneficial change on crystalline structure (primarily the gamma or gamma epsilon structure) of the $MnO_2$ thus enhancing beneficial performance characteristics, e.g. higher open circuit voltage (OCV) and higher capacity, especially when used as cathode active material in an alkaline cell in high power application. The resulting $MnO_2$ product exhibits excellent overall performance characteristics when used as active cathode material in an alkaline cell. Additionally, it has been determined that the resulting $MnO_2$ product can have a slightly lower than normal real density. That is, the real density of the $MnO_2$ product can be as low as between 4.2 and 4.38 $g/cm^3$. Such lower real density is thought to result from a higher level of crystal imperfections such as combined water, cation vacancies, twinning faults and $[SO4]^=$ anions which contribute to the higher OCV and the improved performance of the $MnO_2$ when used as cathode active material in an alkaline cell.

The advantages of this procedure are that a superior quality EMD may be produced, particularly for high power applications and/or that the rate of production may be increased several fold (because of the electrolysis at higher current densities) over that of conventional EMD plating processes thereby reducing the needed investment in plating equipment and the size of the plant to accommodate this equipment. Labor is also reduced due to the shorter plating cycle and reduced time spent in monitoring the process for each unit of material plated.

The electrolysis bath desirably has an $MnSO_4$ concentration of between about 0.2 and 2.0 moles/liter and the $H_2SO_4$ concentration between about 0.1 and 1.0 moles/liter. An anode and cathode are inserted into the electrolysis bath, and preferably submerged in the bath. The bath and electrodes are housed within a closed casing forming the electrolytic cell. The electrodes are connected to a direct current power source, which can be externally located. The anode is defined as the electrode at which oxidation occurs and therefore is connected to the positive terminal of the direct current power source and the cathode is connected to the negative terminal of the power source. During electrolysis the bath is maintained at an elevated temperature above 108° C., desirably a temperature above 110° C., preferably above 115° C. Desirably the bath can be maintained at a temperature between about 110° C. and 180° C., desirably at a constant temperature between about 115° C. and 155° C., for example, between 120° C. and 155° C., typically at a temperature of 120° C. The electrolysis is carried out at a current density between about 2.0 and 37.5 Amp/sq. ft (21.5 and 405 Amp/sq. meter) of anode surface. Desirably the current density is maintained at about 2.0 Amp/sq. ft. to 25.00 Amp/sq. ft. (21.5 $Amp/m^2$ and 270 $Amp/m^2$) of anode surface. Preferably, the electrolysis is carried out at elevated current density of between 12.5 and 37 $Amp/ft^2$ (135 $Amp/M^2$ and 400 $Amp/M^2$) of anode surface. For comparison, conventional EMD electrolysis baths operating in the range of 80 to 98 deg. C. and normal atmospheric pressure normally operate at a current density of 5 to 8 A/ft2 and rarely exceed 10A/ft2 due to the well known danger of passivating the Ti electrodes used in the production of high quality EMD.

In conjunction with the above conditions of high temperature and super-atmospheric pressure and, optionally, increased current density, a doping agent, such as Ti+4, may be added to raise the SSA. For example, sufficient Ti+4 may be added to create a final doping level of about 2,160 ppm Ti in the final EMD deposit. This may be achieved by a variety of means such as adding a soluble titanium compound to the cell electrolyte (e.g. $TiOSO_4$) or by corroding the Ti anode, prior to commencing the electrolysis, so as to dope the electrolyte with the required quantity of dissolved Ti, or by maintaining a body of Ti metal in the electrolysis cell throughout the electrolysis and inducing it to corrode at a controlled rate, so as to continually replenish the dissolved Ti, as it is consumed in the formation of the EMD deposit.

Preferably, hydrogen produced during the electrolysis is removed as effluent from the electrolytic cell along with at least a portion of spent electrolyte. The electrolysis bath can be continuously replenished with a flow of fresh electrolyte solution comprising fresh $H_2SO_4$ and $MnSO_4$ in water. Thus, the aqueous electrolysis bath can desirably be maintained at a steady state composition, with the $MnSO_4$ concentration at a constant value between about 0.2 and 2.0 moles/liter and the $H_2SO_4$ concentration at a constant value between about 0.1 and 1.0 moles/liter. Advantageously, the concentration of the $MnSO_4$ in the aqueous bath is maintained at a steady state concentration of 0.9 mole per liter (136 g/liter) and the concentration of the $H_2SO_4$ at 0.5 mole per liter (49 g/liter).

During the electrolysis the cell is tightly sealed and a steady state gas phase is formed essentially in vapor-liquid equilibrium with the electrolysis bath. In a preferred aspect of the process, hydrogen produced during the electrolysis is continuously removed from the cell and thus its partial pressure in the gas phase can be very small and even negligible. In such case, the pressure maintained in the cell can essentially be equal to the water vapor equilibrium partial pressure corresponding to bath temperature at the bath steady state composition. The a cell during electrolysis is desirably maintained at a bath temperature, above 110° C., preferably above 115° C., desirably between about 115° C. and 155° C. and at a pressure approximating the vapor pressure of water in equilibrium with the electrolyte solution in the bath. For example, when the cell bath is maintained at a temperature of 120° C., the cell pressure can be about 2 atmospheres absolute. Thus, if the cell bath is maintained at a constant temperature of between about 115° C. and 155° C., the cell equilibrium pressure can correspondingly be between about 1.7 and 5.4 atmospheres, absolute.

During the electrolysis, manganese dioxide accumulates continuously on the surface of the anode for around 1½ to 3 weeks, until a thickness of about 1.0 to 3.0 cm is achieved. The electrolysis is interrupted at this point and the anodes are withdrawn from the bath. The $M_nO_2$ can be harvested by applying mechanical shock to the anode which fractures the $M_nO_2$ and allows it to fall away from the anode surface, as "chip". The recovered manganese dioxide chip can be crushed, ground, washed, neutralized and dried in a conventional manner. The order of these operations may be interchanged, that is, grinding may be performed before or after washing etc. The manganese dioxide product of the invention has a predominantly gamma crystalline structure. However, the manganese dioxide product of this invention has a real density between about 4.20 and 4.40 g/cm$^3$, more typically between about 4.20 and 4.38, for example, between about 4.20 and 4.35. Such real density range is lower than the real density of manganese dioxide made by conventional electrolysis processes, typically between about 4.4 and 4.6 g/cm$^3$ when the electrolysis bath temperatures are maintained between about 80° C. and 98° C. It has been determined that the MnO$_2$ product of the invention can have a real density between 4.20 and 4.40 g/cm$^3$, more typically between 4.20 and 4.38 g/cm$^3$ in conjunction (simultaneously) with a specific surface area (SSA) between the desired 18 and 45 m$^2$/g.

The real density of a solid is the solid sample weight divided by its real volume, that is, the solids sample apparent volume reduced by the open pore volume occupied by air or liquid. The real solids volume is conventionally measured by displacement of He gas in a Helium Pycnometer apparatus. Prior to determining its volume, the sample is degassed by gentle heating in vacuum or in a dry gas stream, in order to eliminate gas or liquid residing in the open pores which might interfere with the measurement of the volume of solid material. Also the valence of the manganese in the manganese dioxide product of the invention is typically between about 3.94 and 3.98, which is higher than that achieved in conventional battery grade manganese dioxide including battery grade electrolytic manganese dioxide (EMD) made by conventional electrolysis methods. This corresponds to a stoichiometric formula MnO$_x$, wherein x has an average value between about 1.97 and 1.99. Such higher valence is achieved by the electrolysis process of the invention without subjecting the manganese dioxide product to further oxidation, for example, without subjecting the manganese product to ozone gas, or other strong oxidizing agent to increase the oxidation state (valence) of the manganese. However, it should be understood that the manganese dioxide product of the invention could be subjected to such further treatment.

When the manganese dioxide of this invention contains doping elements or ions, particularly titanium and sulfate, it will exhibit open circuit voltage (OCV) greater than 1.65 V and more typically, 1.68 to 1.69 V when measured against a piece of clean, pure zinc metal in 9N KOH. Ordinary commercial manganese dioxide shows an OCV of 1.60–1.63 V and premium, high power manganese dioxide an OCV of 1.63–1.65 V under the same conditions.

The manganese dioxide product can be used as cathode active material in electrochemical cells, for example, zinc/MnO$_2$ alkaline cells. It has been determined that when the manganese dioxide product containing doping elements or ions, particularly titanium and sulfate, is used as cathode material in alkaline cells, the service life increases substantially, on high power (0.5 to 2 watt) applications.

BRIEF DESCRIPTION OF THE DRAWINGS

FIG. 3c is a graph showing the capacity (Amp-hr) of an AA size Zn/MnO$_2$ alkaline cell (discharged to 0.8 volt) wherein the MnO$_2$ in the alkaline cell was prepared by electrolysis performed at various current densities and at electrolysis bath temperature of 120° C.

DETAILED DESCRIPTION

Figure 1:
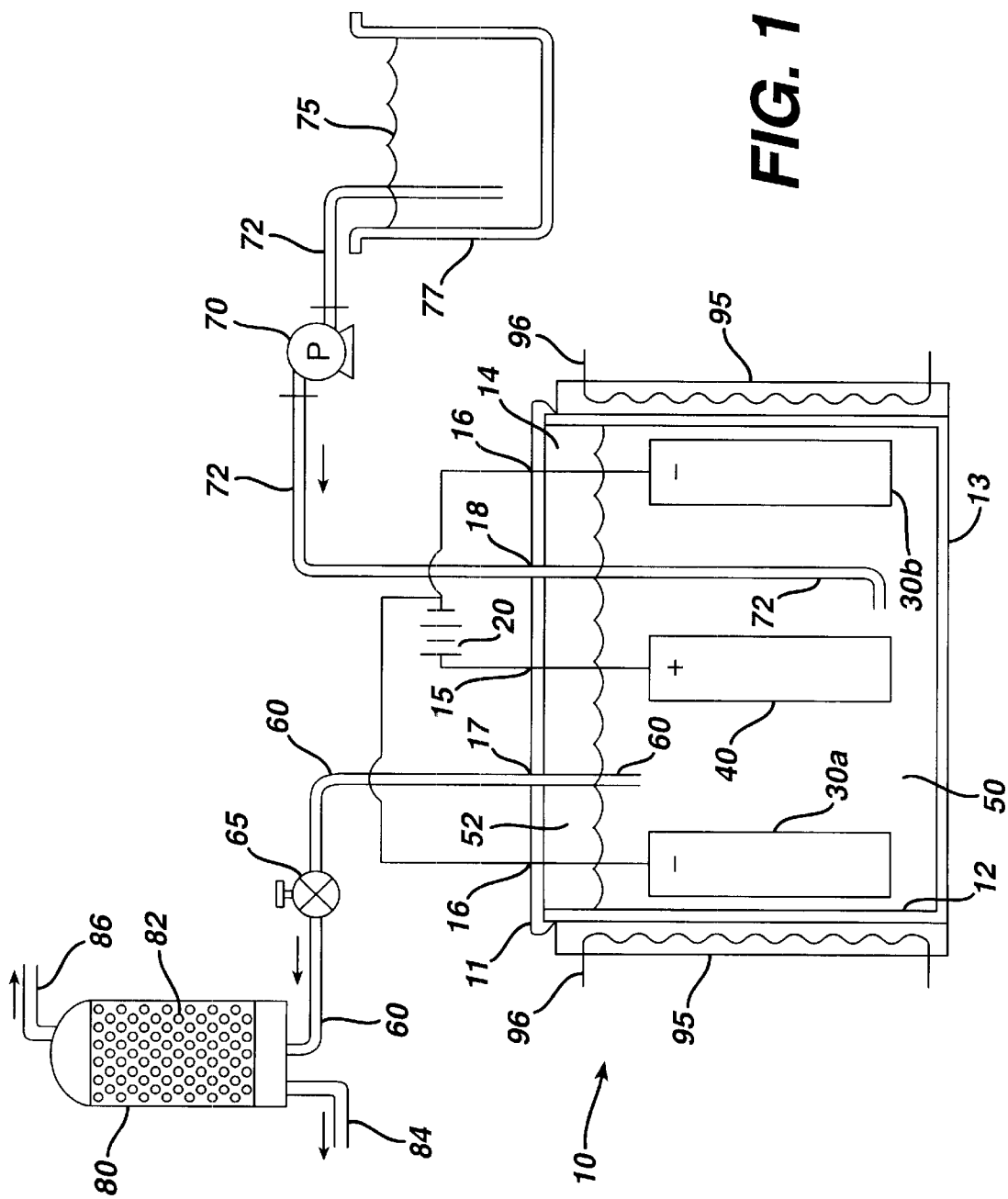
FIG. 1 is a schematic drawing of the electrolysis process of the invention.

A preferred embodiment of the process of the invention is shown in FIG. 1. An electrolysis unit such as electrolytic cell 10 is formed of steel casing 12 which has a closed bottom end 13 and an open end 14. The interior surface of the cell is completely lined with a corrosion resistant plastic material such as polytetrafluoroethylene (PTFE), perfluoro-alkoxy resin (PFA) or polyvinylidene fluoride or glass, or a corrosion resistant metal such as zirconium or tantalum. The open end 14 can be fitted with a tightly secured removable cover 11. There are apertures 17 and 18 in the cover for insertion of small diameter pipes. There can be additional apertures 15 and 16 in cover 11 for insertion of electrical wires. Such apertures are tightly sealed around the pipes or wires therethrough to prevent loss of pressure in the cell once the cell is activated.

An electrolysis bath 50 is prepared by mixing manganese sulfate (MnSO$_4$) and sulfuric acid (H$_2$SO$_4$) in water forming a solution having a preferred concentration of the MnSO$_4$ of 0.9 mole per liter (136 g/liter) and a concentration of the H$_2$SO$_4$ of 0.5 mole per liter (49 g/liter). Alternative electrolysis bath 50 compositions are also possible. For example, the bath 50 can be an aqueous solution wherein the MnSO$_4$ concentration is between about 0.2 and 2.0 moles/liter and the $H_2SO_4$ concentration is between about 0.1 and 1.0 moles/liter. The electrolysis bath is poured into the casing. Manganese sulfate ($MnSO_4$) used is of high purity known in the art as reagent grade. Reagent grade manganese sulfate in anhydrous or hydrate form can be used, for example, as supplied by Spectrum Chemical Co. Alternatively, a commercial grade of manganese sulfate may be employed, but only after being subjected to special purification steps in order to remove any impurities which might be deleterious to the functioning or storage life of a galvanic cell containing said $MnO_2$ product. The above indicated bath concentration is based on stoichiometrically pure $MnSO_4$ and $H_2SO_4$.

In a preferred embodiment, the electrolysis is carried out at elevated temperatures between about 110° C. and 180° C. C, preferably between 115° C. and 155° C., advantageously between 120° C. and 155° C., also advantageously between 125° C. and 155° C., and together with increased current densities, preferably between 12.5 and 37 Amp/$ft^2$ (135 and 400 Amp $m^2$) of anode surface. Preferably, a soluble dopant is added to the electrolysis bath. The preferred dopants are soluble titanium dopants such as TiOS04, TiOCl2, CaTi2O4 (OH)2, SrTiOF4 and (TiO)2P2O7. The dopant TiOSO4 is preferred. The electrolysis is preferably carried out using a titanium anode and graphite cathode. Alternatively, the anode can be of graphite, lead or lead alloy and the cathode may be of copper. The operation of the electrolysis at increased current density with addition of dopant compensates for the decrease in the $MnO_2$ specific surface resulting from conducting the electrolysis at elevated temperature. The elevated current density and addition of dopant has the effect of raising the specific surface (SSA) of the $MnO_2$ product to within optimal levels of between 18 to 45 $m^2$/q. The resulting $MnO_2$ product exhibits excellent overall performance characteristics when used as a cathode active material in an alkaline cell.

In the case of doping by titanium, where the titanium is supplied by dissolving a soluble titanium compound in the bath solution and in the solution which is continuously fed into the bath during electrolysis, a typical dopant material is TiOSO4 and a typical doping level is 0.30 to 0.84 g/l TiOSO4. The actual concentration is determined by the desired doping level in the final EMD product and this will be influenced in turn by other operating conditions such as temperature, current density and feed rate. The concentrations given here are approximately correct for a plating bath operated at 120 deg. C. and 12.5 A/$ft^2$ (135 Amp/$m^2$) and a bath composition of 0.9M MnSO4,0.5M H2SO4. Concentrations of TiOSO4 outside of the stated range may be desirable when other operating conditions are changed, i.e. when temperature is different than 120 deg. C, when current density is different than 12.5 A/ft2 and when the bath composition is different than 0.9M MnSO4+0.5M H2SO4.

It is understood that the dopant may be supplied to the bath by other means in place of dissolving it in the bath solution or the solution which is fed to the bath during the electrolysis. For example, in the case of a metal dopant, a piece of the metal (e.g. titanium) may be suspended in the bath and be allowed or induced to corrode at a controlled rate.

The cell 10 also preferably comprises a number (n+l) of cathodes, e.g. 2 cathodes 30*a* and 30*b*, connected in parallel to the negative terminal of a direct current power source 20 and a number of anodes (n), e.g. one anode 40, connected to the positive terminal of the power source 20. The power source is a regulated direct current power source. The anode or anodes 40, are preferably located in between and equally spaced from the cathodes 30*a* and 30*b* as shown in FIG. 1. The anode(s) and cathode(s) are inserted into the casing, preferably so that they are submerged in the bath 50, but partial immersion is also acceptable. When partially immersed, the electrolytic reactions occur only on the wetted surfaces, below the solution-vapor interface. The anode (s) and cathode(s) are normally of flat, rectangular shapes, but other shapes, such as flat polygonal, circular, and elliptical can be used as well as using anodes which are not flat, such as corrugated or puckered plates with or without perforations or curved plates. Solid rods of various cross sectional configurations, such as a circular cylinders and hollow cylinders or sections thereof may also be employed as anodes. The cathode configuration should be such as to maintain a reasonably uniform separation from the anode, at all points. The anode 40 is preferably of commercial grade titanium. However, anode 40 can also be of graphite, lead or lead alloy, or special grades of titanium. The cathodes 30*a* and 30*b* are preferably graphite. However, the cathodes can also be copper, lead or lead alloy. During electrolysis the manganese ions from the $MnSO_4$ are oxidized at the anode forming manganese dioxide which accumulates on the surface of anode. Hydrogen gas is emitted as a byproduct of the electrolysis at the cathodes. The electrolysis reactions are:

Anode: $Mn^{2+}+2H_2O=MnO_2+4H^++2e$

Cathode: $2H^++2e^-=H_2$

Overall: $Mn^{2+}+2H_2O=H_2+MnO_2+2H^+$

External heaters 95 with electrical heating elements 96 can be placed around cell casing 12 and used to maintain the electrolysis bath 50 at a constant temperature throughout the electrolysis. The electrolysis is desirably carried out at elevated temperatures above conventional temperatures. In accordance with specific embodiments of the invention the electrolysis bath 50 is maintained at a constant temperature above 108° C., desirably a temperature above 110° C., preferably above 115° C. Desirably the bath 50 can be maintained at a temperature between about 115° C. and 155° C. In a preferred embodiment electrical heaters can be used to maintain the bath at a constant temperature of 120° C. within about 0.5 degree centigrade. It will be appreciated that other types of conventional heating devices such as a jacket of hot fluid or steam flowing there-through placed around casing 12 or through a heat exchanger situated within the bath could be used to maintain bath 50 at the desired temperature.

The electrolysis bath 50 can be maintained at a constant composition during the electrolysis, preferably the same as the initial composition, by continuously pumping fresh electrolyte into bath 50 during the electrolysis. The fresh electrolyte 75 can be pumped from tank 77 into cell bath 50 through line 72 using a conventional piston or diaphragm pump 70. Line 72 penetrates through the cover aperture 18 which is tightly sealed with a deformable liner or gasket. The fresh electrolyte 75 preferably has an $MnSO_4$ concentration higher than the steady state $MnSO_4$ concentration in bath 50 and a concentration of $H_2SO_4$ lower than the steady state $H_2SO_4$ concentration in bath 50. Thus, when the bath 50 is intended to have a steady state concentration of 0.9 mole/ liter MnSO4 and a steady state $H_2SO_4$ concentration of of 0.5 mole/liter, the fresh electrolyte 75 can be an aqueous solution having the composition $MnSO_4$ 1.35 moles/liter and $H_2SO_4$ 0.05 moles/liter. During electrolysis fresh electrolyte 75 can be pumped into bath 50 at a rate necessary to replenish the oxidized manganese ions and maintain the bath concentration at a steady state. The cell can also be provided with an effluent line 60 passed into bath 50 through aperture 17 in cover 18. Aperture 17 is tightly sealed after line 60 is inserted therethrough. A relief valve 65 can be inserted into line 60. During the electrolysis the relief valve 65 can be used to maintain the cell pressure at the desired pressure level. It is desirable to continuously bleed hydrogen byproduct and maintain the cell pressure at a pressure approximately corresponding to the partial pressure of the water vapor in gas phase 52.

Preferably both hydrogen gas and spent electrolyte formed during electrolysis are continuously bled from the cell through line 60. This can be accomplished by passing the hydrogen gas and spent electrolyte to a packed bed vessel 80 through cell effluent line 60. Vessel 80 can be filled with conventional packing 82, for example, PVC plastic beads or balls. As hydrogen passes through the packed vessel 80, it separates from the spent electrolyte and escapes from the vessel via overhead line 86. Spent electrolyte passes from the packed bed through bottom line 84. In this manner the electrolysis bath 50 can be replenished and maintained at a steady state composition during the electrolysis.

During the electrolysis process the bath 50 has a steady state composition which, as in above described preferred embodiment, is an aqueous solution having a composition of $MnSO_4$ (0.9 mole/liter) and $H_2SO_4$ (0.5 mole/liter). During electrolysis the bath 50 is at steady state composition and in equilibrium with the vapor existing in the head space of the cell, above the liquid level. Assuming ideal gas behavior for purposes of estimation, the total pressure of the gas phase 52 can be represented as:

$$P_{Total} = P_{H2O} + P_{H2} \quad \text{(I)}$$

The partial pressure of the water vapor in the gas phase can be estimated from Raoult's Law as:

$$P_{H2O} = xP°_{H2O} \quad \text{(II)}$$

where x is the mole fraction of $H_2O$ in the liquid bath and $P°_{H2O}$ is the vapor pressure of water at the bath temperature.

If electrolysis bath 50 has a concentration of MnSO4 of 0.9 mole per liter (136 g/liter) and a concentration of the $H_2SO_4$ of 0.5 mole per liter (49 g/liter), the concentration of water in the bath is about 53.6 moles per liter (965 g/liter divided by 18, the M.W. of water.) Thus, the mole fraction composition of the electrolysis bath is $MnSO_4$ =0.016; $H_2SO_4$ =0.009; and water =0.975. Since hydrogen formed during the electrolysis is continuously withdrawn through effluent line 60, the steady state equilibrium gas phase 52 contains very little hydrogen. Thus, the gas phase 52 is essentially all water vapor. Therefore, the total pressure $P_{Total}$ is approximately equal to the partial pressure of water (partial pressure of hydrogen gas is negligible) and equations I and II can be represented from Raoult's Law as Equations III and IV:

$$P_{Total} = xP°_{H2O} \quad \text{(III)}$$

$$P_{Total} = 0.975\, P°_{H2O} \quad \text{(IV)}$$

Although it has been stated that the relief valve is most advantageously set so to maintain a pressure close to that of the equilibrium vapor pressure of the H2O in the cell electrolyte, in order to maintain only a negligible H2 partial pressure in the cell, this is not an operational requirement of the invention but simply an economic strategy, to avoid the need to design the pressure vessel for more than the minimum required pressure. One can practice the invention equally well in the presence of a sensible partial pressure of H2, e.g. 1 or 2 atmospheres or more, with no detrimental effect on the quality of the final EMD product. However, in this case due to the higher total pressure involved, the pressure vessel must be more robust, hence more expensive.

In accordance with the process of the invention the electrolysis is desirably carried out at a current density of between about 2.0 and 50 Amp/sq. ft (21.5 and 540 Amp/sq. meter) of anode surface. Desirably, the current density can be maintained between about 6.25 Amp/sq. ft. (67.3 Amp/$m^2$) and 37.5 A/sq. ft (405 A/m2) of anode surface. When the H2 partial pressure is minimized, the cell can be desirably maintained at a total pressure (partial pressure of $H_2$ +partial pressure of H20) of between about 1.7 and 5.4 atmospheres (absolute). This corresponds to a bath boiling point temperature of between about 115° C. and 155° C. The electrolysis cell described herein is not intended to be limited to any particular size or configuration, since it will be appreciated that the process can be scaled up to achieve any desired rate of production. Different designs of the cell are envisioned which would make better use of available internal volume and would be easier to construct and operate than the cell design used in our trials, shown here. A specific example of the process is given as follows:

EXAMPLE 1

In a specific example an electrolysis bath 50 was prepared and poured into cell casing 12. Bath 50 had a liquid volume of 11 liters and a starting concentration of $MnSO_4$ (1.0 mole/liter) and $H_2SO_4$ (0.5 mole/liter). A pair of graphite cathodes 30a and 30b and a single titanium anode 40 were inserted into the casing and submerged in the bath. The cathodes 30*a* and 30*b* were of graphite and the anode was of titanium with a conventionally sand blasted surface finish. The electrodes were connected to a direct current power source 20 and cover 11 secured over the casing. Fresh feed line 72 and effluent line 60 were passed into bath 50 through apertures in the cover, which were then tightly sealed. The anode and cathode were of rectangular shapes.

The bath temperature was raised gradually to 120 deg. C over a period of 3 hrs. 20 minutes while the titanium anode was allowed to float in a non-polarized condition (no applied current or voltage). Thus, the titanium anode was not passivated during heatup and was subject to corrosion by the acidic electrolyte, particularly as the temperature approached its final value of 120 deg C. At this time the current was switched on, starting at 50 ma and was raised in increments to a final value of 0.64A, corresponding to a current density of 6.25A/ft2. Evidence that titanium corrosion had occurred was given by a negative Voltage (Ti anode was negative to the graphite cathodes) noted during the initial phase of the electrolysis, as the current was increased from 50 milliAmp to 0.64 Amp, over a period of about 20 minutes. From this point on, normal polarity was observed (Ti anode positive to the graphite cathodes.) Electrolysis was carried out with bath 50 maintained at a temperature of 120° C. The cell pressure was maintained at 2 atmospheres absolute. The current density was maintained at 6.25 Amp/sq. ft (67.3 Amp/$m^2$) of anode surface. The voltage needed to achieve such current density was regulated as required between about 1.8 to 2.25 Volts. The anode 40, measured 1¾"×3½"×¼" and had a total surface area of 0.1032 $ft^2$ (0.095 sq. meter), including both sides and edges. Electrolysis bath 50 (liquid) occupied a volume of 12 liters, with approximately 5 liters of free space existing in the vessel, above the liquid. During the electrolysis hydrogen by-product and a small amount of steam was continuously removed from the cell through effluent line 60 and passed to packed vessel 80. The hydrogen escaped through overhead line 86 of vessel 80 and condensed steam escaped, as water, from bottom line 84. Because in this case the electrodes were quite small and the total current passed was low, only minimal depletion of $MnSO_4$ occurred and only a minimal amount of $H_2SO_4$ was generated. Therefore, it was not necessary to continuously pump in fresh solution or to remove depleted solution. The average composition of the bath throughout the electrolysis was 0.9M $MnSO_4$ and 0.6M $H_2SO_4$.

The electrolysis was continued for 264 hours. A layer of manganese dioxide of between about 6 to 8 mm thick accumulated on the surface of the anode. The electrolysis was then terminated and the manganese dioxide was harvested from the anode by subjecting it to mechanical shock so as to shatter the deposit and cause it to come loose from the anode. A total of 284.4 grams manganese dioxide chip was obtained. It was then ground, washed, neutralized and dried to obtain 252.1 g of final product. Some significant differences between the product produced according to this invention (called ER-l) and a typical commercial EMD material are shown below in Table 1.

The "Q" ratio is defined as intensity of the 22 deg. X-ray diffraction peak (Cu K-alpha radiation) divided by the intensity of the 37 deg. peak (Cu K-alpha radiation).

The true density as referenced herein is determined by the conventional method of helium pycnometry. Commercial instruments are available from Quantachrome, Micromeritics and other vendors and the vendor literature describes the details of the method. The method requires that the product sample be dried and degassed such that any condensed H2O in the open pores and a majority of the adsorbed gases within the open pores are both eliminated, prior to running the measurement. The void volume within the open $MnO_2$ pores (interparticle pores and intraparticle pores, excepting the tunnel volume within the $MnO_2$ crystalline structure itself) is then filled by introducing a measured dose of helium. The pressure exerted by the helium is then determined and converted to an apparent volume of He, via the ideal gas laws. This apparent volume is subtracted from the known volume of the sample chamber thereby obtaining the real (true) volume of the sample. The true density is calculated as the sample weight divided by the sample real volume.

TABLE 1

Property Comparison

|  | Product $MnO_2$ (ER-1) | Conventional EMD (Typical) |
| --- | --- | --- |
| MnOx (x value) | 1.98 | 1.92–1.96 |
| OCV | 1.69 V | 1.60–1.65 V |
| Ti | 2,160 ppm | 10–15 ppm |
| SO4 = | 1.58% | 1.0–1.2% |
| True Density | 4.34 g/cc | 4.4–4.6 |
| "Q" ratio | 0.95 | 0.6–0.7 |
| Specific Surface Area (SSA) | 29.7 m²/g | 20 to 40 m²/g |

The manganese dioxide product had a predominantly gamma crystalline structure.

The manganese dioxide product can be used as cathode active material in electrochemical cells, for example, zinc/$MnO_2$ alkaline cells. It has been determined that such $MnO_2$ when used as cathode material in alkaline cells increases the service life of the cells, particularly when the cells are used in high power (0.5 to 2 watt) applications.

Figure 2:
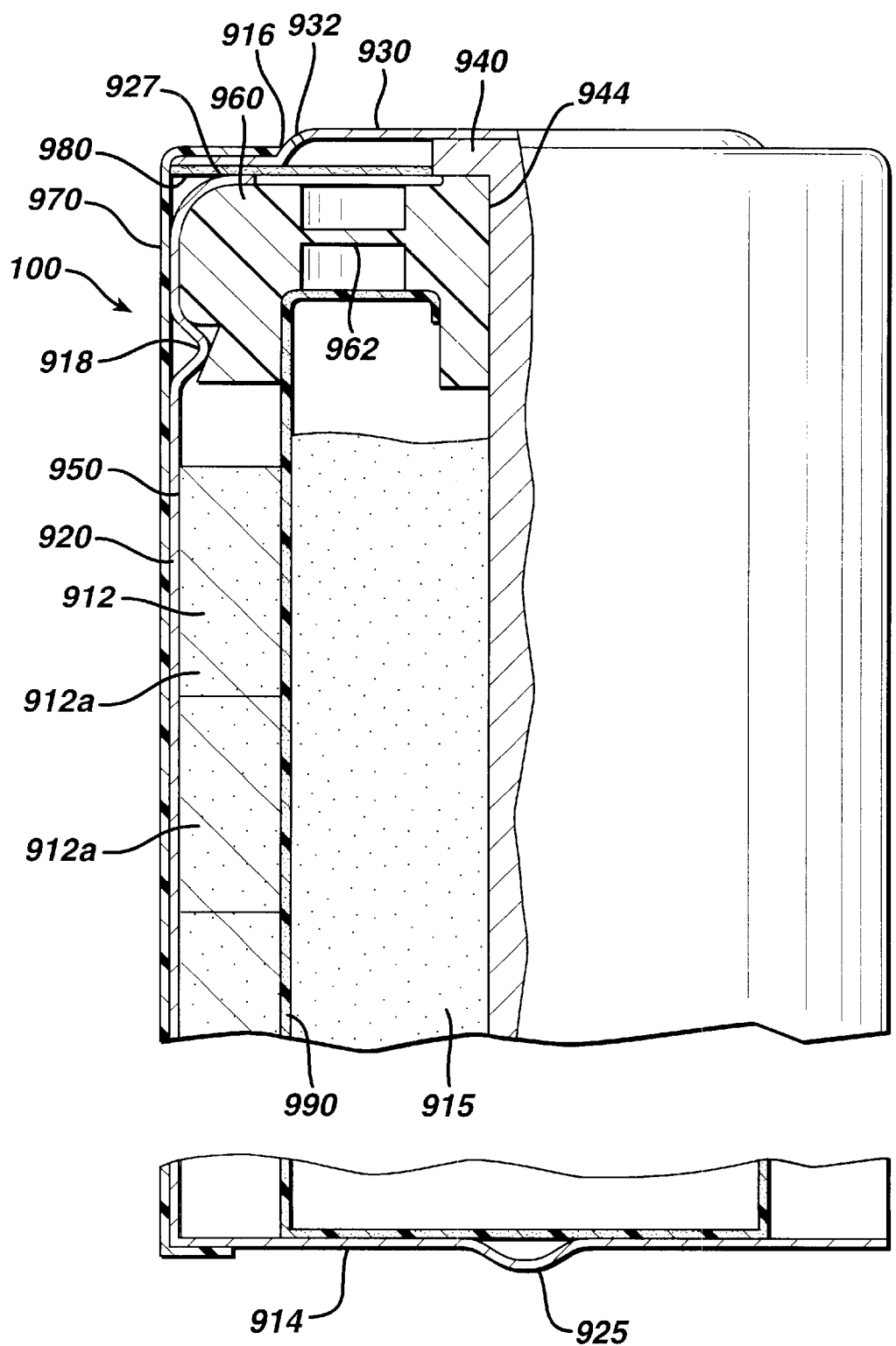
FIG. 2 is a cross sectional view of an alkaline cell using the improved manganese dioxide product of the invention as cathode active material.

A representative alkaline cell configuration is shown in FIG. 2. The alkaline cell 100 comprises a cylindrical steel casing 920, having a closed end 914 and an open end 916. The cell is filled with cathode 912 comprising $MnO_2$ and an anode 915 comprising zinc and electrolyte. The $MnO_2$ made by the electrolysis process of the invention can be employed as the active material in cathode 912. The electrolyte may comprise a conventional mixture of KOH, ZnO and gelling agent. The cathode 912 can be supplied in the form of a series of compacted annular rings 912a. The anode and cathode may be separated by a conventional ion porous separator 990, for example, comprising rayon or cellulose. After cell 100 is filled, an insulating plug 960 is inserted into open end 916. The plug 960 is preferably snap fitted within circumferential step 918 as shown in FIG. 2 so that the plug locks in place into the open end 916. The peripheral edge 927 of casing 920 is crimped over the top of insulating plug 960. A paper insulating washer 980 can be applied over the crimped peripheral edge 927 of casing 920. Insulating washer 980 may be a polyethylene coated paper washer. A terminal end cap 930 is welded to the head of current collector 940. The elongated current collector 940 is then inserted (force fitted) into aperture 944 of insulating plug 960 so that end cap 930 comes to rest against insulating washer 980. Conventional asphalt sealant may be preapplied around the current collector 940 before it is inserted into aperture 944. A portion of the plug 960 is thinned forming a rupturable membrane 962 which ruptures allowing gas to escape from the interior of the cell if the gas pressure therein reaches a predetermined level. The gas will escape through vent holes 932 provided in end cap 930. A film label 970 is applied around casing 920. The terminal end cap 930 becomes the negative terminal of alkaline cell 100 and pip 925 at the closed end of casing 920 becomes the positive terminal.

The cell 100 shown in FIG. 2 can be an AA cell. However, the alkaline cell shown in FIG. 2 is not intended to be restricted to any particular size. Additives may be employed, as conventional, to modify the cell chemistry. Alkaline cell 100 is not intended to be restricted to any particular cell chemistry or cell size. The cell 100 can include such representative chemistries including those which contain zero added mercury (less than 50 parts mercury per million parts total cell weight, preferably less than 10 parts mercury per million parts total cell weight) and modifications thereof. Zero-added mercury cells contain no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight. Representative chemistries, for example, are also disclosed in U.S. Pat. No. 5,401,590, herein incorporated by reference. Also, although the invention is principally directed to primary alkaline cells the anode and cathode chemistries can be adjusted so that the cells become secondary (rechargeable) cells. It is intended that the invention described herein be applicable as well to the cathode of such secondary (rechargeable) alkaline cells.

The following examples illustrate the invention and advantages derived therefrom. (All compositions are by weight unless otherwise specified.) The performance results for the cells tested in the following examples are summarized in TABLE 2.

EXAMPLE 2

Discharge at Constant Current

Primary zinc/manganese dioxide alkaline AA test cells, are employed. The test cells are identical and were prepared with a cathode comprising manganese dioxide made by the improved electrolysis process of the invention as described in the specific embodiment hereinabove. The manganese dioxide used as cathode active material was prepared by the electrolysis method described in Example 1.

AA test cells of the type shown in FIG. 2 were prepared with a cell casing formed of steel which is plated on the inside and outside surface with nickel. The inside surface is also coated with a carbon coating, to further inhibit corrosion of the underlying steel or nickel plate. Conventional anode active material, electrolyte and separator membrane were employed. The cathode comprised the manganese dioxide product made by the process of the invention recited in Example 1. The cathode composition was otherwise conventional. The anode material was in the form of a gelled mixture containing mercury free (zero-added mercury) zinc alloy powder. Such mixture can typically contain aqueous KOH electrolyte solution, gelling agent, e.g. acrylic acid copolymer such as CARBOPOL C940 from B. F. Goodrich; and surfactants e.g. organic phosphate ester surfactant GAFAC PA600 from Rhone Poulenc. The separator membrane can be a conventional electrolyte permeable membrane of polyvinyl alcohol/rayon material. The electrolyte was an aqueous solution of KOH containing about 36 wt. % KOH and 2 wt. % ZnO, hereinafter referred to as "aqueous KOH solution". The cells were balanced so that the mamp-hr capacity of $MnO_2$ (based on 370 mamp-hr per gram $MnO_2$) divided by the mAmp-hr capacity of zinc alloy (based on 822 mAmp-hr per gram zinc alloy) is about 1.05.

The cathode in the cell had the following composition: Electrolytic manganese dioxide (80–87 wt. %), graphite (6–8 wt. %), and a 7–10 Normal ("aqueous KOH solution between about 30–40 wt. KOH concentration") (5–7 wt. %); polyethylene binder (0.1 to 0.5 wt. %). Such cathode mixtures are intended to be illustrative and non intended to restrict the invention.

The anode material in the test cell comprised: Zinc alloy powder 62 to 69 wt. % (99.9 wt. % zinc containing indium), aqueous KOH solution comprising (36 wt. % KOH and about 2 wt. % ZnO); CARBOPOL C940 (B. F. Goodrich) cross linked acrylic acid polymer gelling agent (between 0.5 and 2 wt. %) and Waterlock A-221 (Grain Processing Co.) hydrolyzed polyacrylonitrile grafted onto starch backbone (between 0.01 and 0.5 wt. %; RM-510 (Rhone-Poulenc) dionyl phenol phosphate ester surfactant (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode was between about 69.2 and 75.5 percent by volume of the anode.

Fresh cells were discharged at a high power of 1 Amp constant drain to cut off voltage of 1.1, 1.0, and 0.8 Volt. The service life (hours) was recorded at each cut off and are presented in Table 2. AA size comparative cells having identical components and identical anode and cathode composition as the test cells were prepared except that conventional electrolytic $MnO_2$ (EMD) was used as the cathode material. The conventional $MnO_2$ (EMD) designated as Trona D $MnO_2$ from Kerr McGee Company had a real density of between about 4.4 and 4.5 g/cm$^3$. The comparative cells were discharged at the same 1 Amp constant drain to voltage cutoffs of 1.1, 1.0, and 0.8 Volt. The service life (hours) of the comparative cells were recorded and are presented in Table 2.

As may be seen from Table 2 the test cells employing the manganese dioxide product made by the process of the invention had longer service life at each cut off voltage than the comparative cells.

TABLE 2

| CELL SERVICE LIFE AND ENERGY OUTPUT | | | |
|---|---|---|---|
| | Continuous Discharge at 1 Ampere | | |
| | Cutoff Voltage 0.8 V | Cutoff Voltage 1.0 V | Cutoff Voltage 1.1 V |
| Test Cells Service Hours | 1.508 | 1.031 | 0.686 |
| Comparative Cells Service Hours | 1.306 | 0.893 | 0.509 |

The properties of the manganese dioxide product of the invention which was used as cathode active material in the test cells, that is, as made in accordance with the method described in Example 1, exhibited some important differences compared with the properties of the conventional electrolytic manganese dioxide (EMD).

A striking difference between this material (ER-1) and commercial grade EMD is the high titanium content (2,160 ppm) of this material, indicating that the EMD is effectively doped with Ti. Also notable is the higher than normal S04=(sulfate) content, indicating that some additional doping by S04=was obtained. The manganese dioxide product made in this manner had a true density of 4.34 g/cm3. This was determined to be less than the true density of electrolytic manganese dioxide (EMD) made by conventional electrolysis carried out at bath temperatures between 80 and 98° C., typically between about 4.4 and 4.6 q/cm3. Also very important is the high OCV (1.69 V) of this material, higher than that of normal commercial EMD (1.60 to 1.63 V) and higher than that of the best commercial "high power" EMD (1.65 V).

The manganese in the manganese dioxide product of the invention exhibited a higher valence e.g. around 3.96, than in the conventional EMD. This corresponds to a stoichiometric formula $MnO_x$, wherein x is typically between about 1.97 and 1.99. (Conventional battery grade manganese dioxide does not have a true stoichiometric formula $MnO_2$, but is better represented by the formula $MnO_x$, wherein x is typically between about 1.92 to 1.96, corresponding to an manganese valence of between about 3.84 and 3.92.) Conventional EMD may typically have a value for x of about 1.95 or 1.96, corresponding to a manganese valence of 3.90 and 3.92, respectively.) Although the pH was the same as a typical commercial EMD product (pH=5.5–6.0), the sodium content was lower by nearly one order of magnitude. These differences are presented in Table 3.

TABLE 3

|  | MnO$_2$ Product per Example 1 | Comparative MnO$_2$ per Example 1 |
| --- | --- | --- |
| Stoichiometric Formula | MnO$_x$ (X = 1.98) | MnO$_x$ (1.96 > x > 1.95) |
| Mn Valence (oxidation state) | +3.96 | 3.9 to 3.92 |
| OCV with respect to zinc | 1.69 V | 1.60 to 1.65 |
| Sodium Content, ppm | 365 ppm | 1800 to 3000 |
| Real density, g/cm$^3$ | 4.34 g/cm$^3$ | 4.40 to 4.60 |

It is theorized that the higher open circuit voltage (OCV) and lower real density of the MnO$_2$ product of the invention is due to a higher amount of protons (H+) in the product and the presence of Ti. The greater amount of protons in the MnO2 product is in turn believed due to the higher water activity occurring during electrolysis carried out at the elevated temperature of 120° C. The presence of Ti in the EMD favors a higher OCV by increasing the Free Energy of the MnO$_2$ reduction reaction. That is, the difference in free energy between the starting material in a fresh cell (MnO$_2$) and the reaction product produced upon discharge (MnOOH, Mn$_2$O3, Mn$_2$O$_3$ Zn, Mn$^{++}$) is greater when the starting MnO$_2$ is doped with titanium.

However, simple doping of EMD with Ti done under normal operating temperatures (e.g. 88–98 deg. C. as in DE 3,337,568 to Varta Batterie AG, Inventors K. Kordesch and J. Gsellman and below 102 deg C.—the boiling point of standard electrolyte under atmospheric pressure—as in "Production and Characterization of Electrolytically Doped Manganese Dioxide", Jour. Power Sources, 70 (1998) 1–7, authors L. Binder et al) is not reported to give any advantage in terms of performance in a primary galvanic cell (only secondary) nor is there any mention of higher than normal OCV. The only advantage claimed in these references is that of better rechargeability in a secondary cell. We believe that the advantages of titanium doping can only be realized when the electrolysis is conducted at elevated temperature and super-atmospheric pressure so as to balance the opposing effects of doping and temperature on crystallite size and surface area, as explained earlier.

The higher OCV and lower sodium (Na$^+$) content are believed partially responsible for the greater service life of the MnO$_2$ product, particularly under high power application. It is otherwise not conjectured why the cells with the manganese dioxide product of the invention showed so much better performance. There may be changes within the manganese dioxide crystalline structure, particle structure or other changes, which resist definition, but nevertheless can be attributed to the improved electrolysis process of the invention for synthesis of manganese dioxide.

EXAMPLE 3

A series of plating trials were run at 120 deg. C. and at increasing current densities: 6.25, 12.5, 18.75, 25.0 and 37.5 Amp/ft$^2$. Doping agents were not added. The trial at 6.25 Amp/ft$^2$ was run for 11 days. The remaining trials were run for shorter periods of time, in inverse proportion to the current density, so as to obtain an approximately constant weight of deposit in all trials amounting to about 1.5 kg.

A current density of 5 to 8 Amp/ft$^2$ is considered to be typical for plating good quality commercial EMD at atmospheric pressure. It is generally recognized that when plating at the usual temperatures (up to 98 deg. C.) at current densities greater than about 10 Amp/ft$^2$ there is a risk of passivating the Ti anode and that plating at current density of 18.75 Amp/ft2 would certainly result in anode passivation. Despite this, we experienced no anode passivation in any of the trials, presumably due to the high temperature (120 deg. C.) employed.

The deposit was harvested from the anode and the obtained chip was finished according to conventional procedures of crushing, grinding, washing, neutralizing (with NaOH) and drying, similar to those employed in example 1. AA cells were constructed as above described (see Example 2) and with the harvested MnO$_2$ as cathode active material. A series of control cells was also constructed according to the same design, but using commercially available EMD from Kerr McGee corporation, which was a blend of 50% standard Kerr McGee EMD (Trona D) and 50% of Kerr McGee High Power EMD.

A 1A (1 Amp) continuous discharge was run on all groups (AA size cells) and the average capacity to 1.1 V, 0.9 V and 0.8 V was recorded as in Table 4.

TABLE 4

| Current Density For Making MnO$_2$ (Amp/ft$^2$) | To 1.1 V | to 0.9 V | to 0.8 V |
| --- | --- | --- | --- |
| Test Alkaline Cells-Capacity (Amp-hrs) | | | |
| 6.25 | 0.103 | 0.613 | 0.913 |
| 12.50 | 0.297 | 0.995 | 1.161 |
| 18.75 | 0.293 | 0.932 | 1.076 |
| 25.00 | 0.332 | 0.985 | 1.144 |
| 37.50 | 0.251 | 0.838 | 0.952 |
| Control Alkaline Cells-Capacity (Amp-Hrs) | | | |
| (Kerr McGee MnO$_2$) | 0.400 | 1.109 | 1.274 |

Figure 3A:
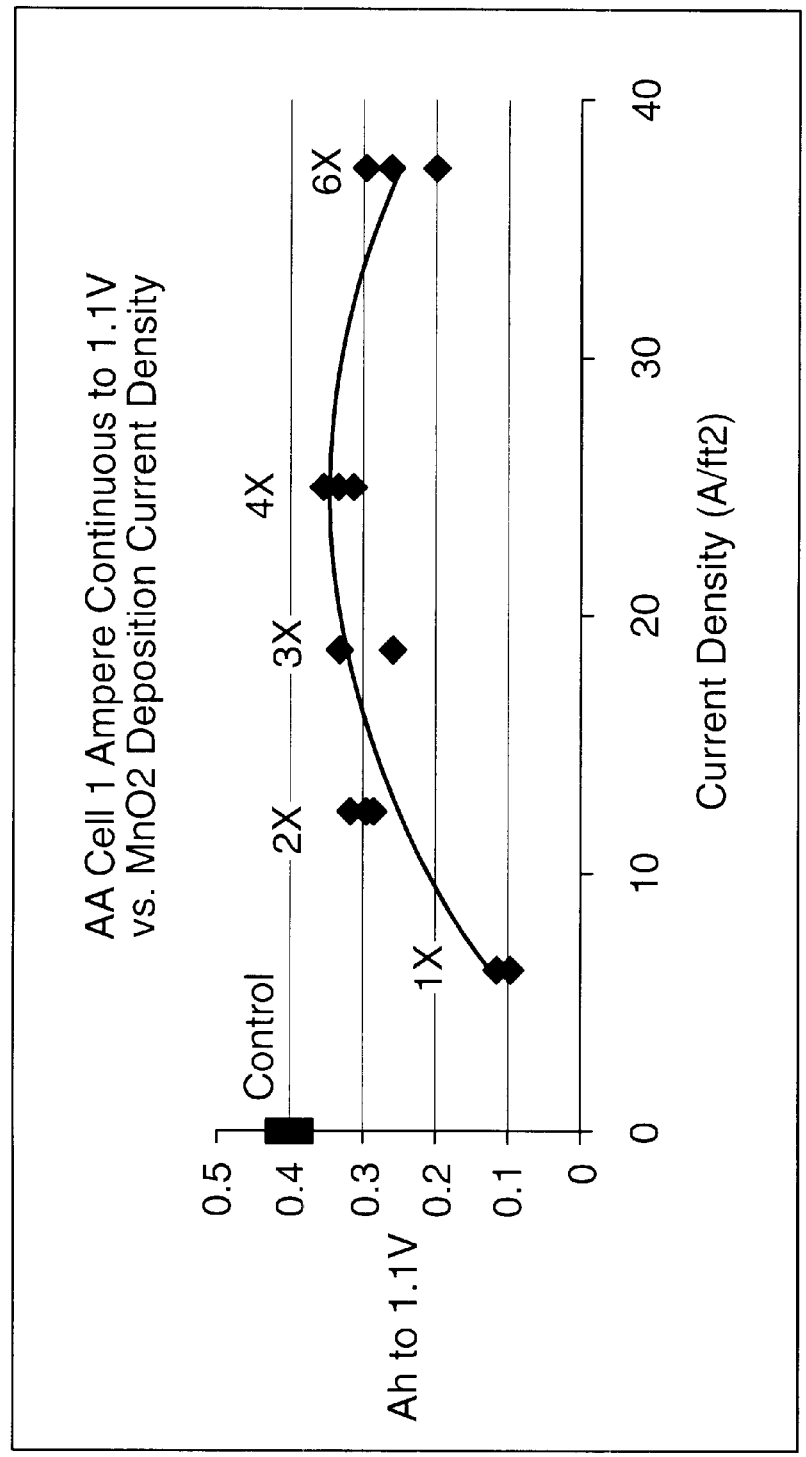
FIG. 3a is a graph showing the capacity (Amp-hr) of an AA size Zn/MnO$_2$ alkaline cell (discharged to 1.1 volt) wherein the MnO$_2$ in the alkaline cell was prepared by electrolysis performed at various current densities and at electrolysis bath temperature of 120° C.
Figure 3B:
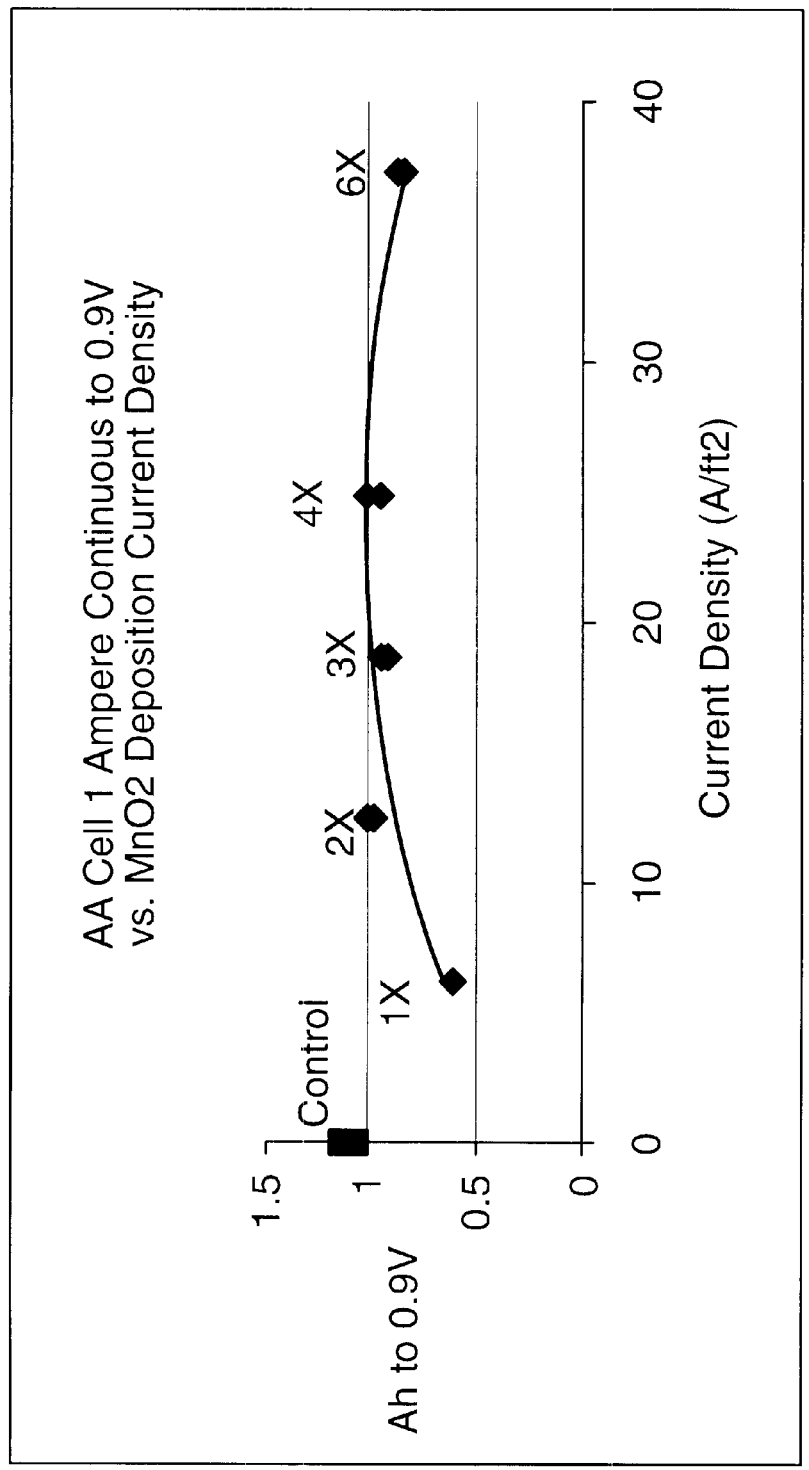
FIG. 3b is a graph showing the capacity (Amp-hr) of an AA size Zn/MnO$_2$ alkaline cell (discharged to 0.9 volt) wherein the MnO$_2$ in the alkaline cell was prepared by electrolysis performed at various current densities and at electrolysis bath temperature of 120° C.

These same results are summarized graphically in FIGS. 3$a$, 3$b$ and 3$c$. (The capacity of the control cells discharged to the same cutoff voltage as the test cells is also shown in FIGS, 3$a$, 3$b$, and 3$c$.)

From the data and graphs (FIGS. 3$a$, 3$b$, and 3$c$) it is seen that we have produced an electrolytic manganese dioxide (EMD) at 120 deg. C. and current densities of 18.75 or 25.0 Amp/ft$^2$ which rivals a blend containing 50% good alkaline quality commercial EMD and 50% premium high power EMD. Thus, by operating the electrolysis process at elevated temperature and super-atmospheric pressure and by simultaneously increasing the current density of the electrolysis (based on anode surface) an excellent high rate EMD is obtained. The main advantage here over a conventional process, conducted at normal temperature (80–98 deg C.) and atmospheric pressure, is that the plating rate can be 4 times higher, hence only one fourth as many electrolytic cells are required to sustain a given rate of production.

Clearly combinations of variables can be employed such as titanium doping coupled with an increase in current density to obtain the combined advantages, higher performance and faster plating, illustrated separately by these examples.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. An electrolysis process for manufacture of manganese dioxide comprising the steps of:
   (a) forming an electrolysis system comprising an anode, a cathode, and an electrolysis bath comprising a solution comprising manganese sulfate ($MnSO_4$), sulfuric acid ($H_2SO_4$), water, and
   (b) heating said bath to a temperature above 110° C.,
   (c) subjecting said bath to electrolysis while maintaining said bath at above 1100 C, and at a current density of between 12.5 and 37 Amp/ft$^2$ (135 Amp/m$^2$ and 400 Amp/m$^2$) of anode surface area, thereby forming manganese dioxide product and hydrogen gas byproduct.

2. The process of claim 1 wherein the electrolysis is carried out at a current density between 18 and 37 Amp/ft$^2$ (194 Amp/m$^2$ and 400 Amp/m$^2$) of anode surface.

3. The process of claim 1 wherein the anode is titanium.

4. The process of claim 1 wherein the electrolysis is carried out essentially without causing passivation of the anode.

5. The process of claim 1 wherein the electrolysis is carried out at a temperature of between 115° C. and 155° C.

6. An electrolysis process for manufacture of manganese dioxide comprising the steps of:
   (a) forming an electrolysis system comprising an anode, a cathode, and an electrolysis bath comprising a solution comprising manganese sulfate ($MnSO_4$), sulfuric acid ($H_2SO_4$), water, and a doping agent soluble in said bath and
   (b) heating said bath to a temperature above 110° C.,
   (c) subjecting said bath to electrolysis while maintaining said bath at above 110° C. and under super atmospheric pressure, and at a current density of between about 2.0 and 37 Amp/sq. ft (21.6 and 400 Amp/sq. meter) of anode surface area, thereby forming manganese dioxide product and hydrogen gas byproduct.

7. The process of claim 6 wherein the anode is titanium.

8. The process of claim 6 wherein the electrolysis is carried out essentially without causing passivation of the anode.

9. The process of claim 6 wherein the electrolysis is carried out at a temperature of between 115° C. and 155° C.

10. The process of claim 6 wherein the doping agent is selected from the group consisting of titanium element, titanium ion, and titanium compound and mixtures thereof.

11. The process of claim 6 wherein the doping agent is selected from the group consisting of a titanium compound selected from the group consisting of $TiOSO_4$, $TiOCl_2$, $CaTi_2O_4(OH)_2$, $SrTiOF_4$ and $(TiO)_2P_2O_7$, and mixtures thereof.

12. The process of claim 6 wherein the doping agent comprises $TiOSt_4$.

13. An electrolysis process for manufacture of manganese dioxide comprising the steps of:
   (a) forming an electrolysis unit comprising an anode, a cathode, and an electrolysis bath comprising a solution comprising manganese sulfate ($MnSO_4$), sulfuric acid ($H_2SO_4$), water, and a doping agent soluble in said bath, and
   (b) heating said bath to a temperature above 110° C.,
   (c) subjecting said bath to electrolysis while maintaining said bath at above 110° C. and under super atmospheric pressure, and at a current density of between 12.5 and 37 Amp/ft$^2$ (135 and 400 Amp/m$^2$) of anode surface area, thereby forming manganese dioxide product and hydrogen gas byproduct.

14. The process of claim 13 wherein said doping agent has the property of increasing the specific surface area of the manganese dioxide product.

15. The process of claim 13 wherein the manganese dioxide product has a specific surface area of between 18 and 45 m$^2$/g.

16. The process of claim 13 wherein the electrolysis is carried out at a current density between 18 and 37 Amp/ft$^2$ of anode surface.

17. The process of claim 13 wherein the doping agent is selected from the group consisting of titanium element, titanium ion, and titanium compound and mixtures thereof.

18. The process of claim 13 wherein the doping agent is selected from the group consisting of a titanium compound selected from the group consisting of $TiOSO_4$, $TiOCl_2$, $CaTi_2O_4(OH)_2$, $SrTiOF_4$ and $(TiO)_2P_2O_7$.

19. The process of claim 13 wherein the doping agent comprises $TiOSO_4$.

20. The process of claim 13 further comprising the step
   (d) washing said manganese product, and
   (e) inserting said manganese product into an alkaline cell as cathode active material.

21. The process of claim 13 wherein said bath is heated to a temperature above 115° C. and the electrolysis is carried at said temperature above 115° C.

22. The process of claim 21 wherein the electrolysis bath is heated to a temperature between about 115° C. and 155° C. and said electrolysis is carried out at said temperature between about 115° C. and 155° C.

23. The process of claim 22 wherein said bath is maintained at a temperature between 115° C. and 155° C. and at a corresponding equilibrium pressure between 1.7 and 5.4 atmospheres.

24. The process of claim 23 wherein said electrolysis is carried out while the electrolysis bath is housed within said electrolysis unit being a closed cell and a gas comprising water vapor and hydrogen byproduct is formed.

25. The process of claim 24 further comprising the step of removing hydrogen byproduct during said electrolysis.

26. The process of claim 25 wherein said water vapor is in contact with said electrolysis bath and in vapor-liquid equilibrium therewith.

27. The process of claim 24 wherein said superatmospheric pressure is equal to or greater than the partial pressure of the water vapor in equilibrium with the electrolysis bath at said temperature at which the electrolysis is carried out.

28. The process of claim 25 wherein the electrolysis is carried out by inserting an anode and cathode into the bath and connecting said anode and cathode to a direct current power source, whereby the manganese dioxide product forms on said anode.

29. The process of claim 28 further comprising replenishing the electrolysis bath with fresh solution comprising manganese sulfate ($MnSO_4$), sulfuric acid ($H_2SO_4$), and water during the electrolysis.

30. The process of claim 13 wherein the manganese dioxide product has a real density between about 4.20 and 4.40 g/cm$^3$.

31. The process of claim 13 wherein the manganese dioxide product has a real density between about 4.20 and 4.38 g/cm$^3$.

32. The process of claim 13 wherein the manganese in the manganese dioxide product has a valence of at least 3.94 and an open circuit voltage (OCV) of at least 1.66 Volts, or greater with respect to zinc, as measured in 9N KOH electrolyte.

33. The process of claim 32 wherein the manganese in the manganese dioxide product has a valence of between 3.94 and 3.98 (corresponding to $MnO_x$, wherein x has an average value between about 1.97 and 1.99), and the open circuit voltage (OCV) with respect to zinc is between 1.66 Volts and 1.70, as measured in 9N KOH electrolyte.

* * * * *